US012669822B2

(12) United States Patent (10) Patent No.: US 12,669,822 B2
Monaci et al. (45) Date of Patent: Jun. 30, 2026

(54) DISTILLING INFORMATION FOR CROWD-AWARE ROBOT NAVIGATION

(71) Applicant: NAVER CORPORATION, Gyeonggi-do (KR)

(72) Inventors: Gianluca Monaci, Grenoble (FR); Michel Aractingi, Grenoble (FR); Tomi Silander, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 345 days.

(21) Appl. No.: 18/107,904

(22) Filed: Feb. 9, 2023

(65) Prior Publication Data

US 2023/0359212 A1 Nov. 9, 2023

Related U.S. Application Data

(60) Provisional application No. 63/338,614, filed on May 5, 2022.

(51) Int. Cl.
*G05D 1/00* (2024.01)
*G06T 7/50* (2017.01)

(52) U.S. Cl.
CPC ......... *G05D 1/0221* (2013.01); *G05D 1/0088* (2013.01); *G05D 1/0246* (2013.01); *G06T 7/50* (2017.01); *G06T 2207/10028* (2013.01); *G06T 2207/20081* (2013.01); *G06T 2207/20084* (2013.01); *G06T 2207/30196* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 9,776,323 B2* | 10/2017 | O'Sullivan | ........... | G06N 20/00 |
| 10,452,978 B2 | 10/2019 | Shazeer et al. | | |
| 11,851,081 B2* | 12/2023 | Refaat | ................. | B60W 60/001 |
| 2022/0180090 A1* | 6/2022 | Song | ................... | G06V 40/161 |

(Continued)

FOREIGN PATENT DOCUMENTS

CN 112631296 A * 4/2021 ........... G05D 1/0214

OTHER PUBLICATIONS

Proximal Policy Optimization Algorithms (Year: 2017).*

(Continued)

*Primary Examiner* — James J Lee
*Assistant Examiner* — Elizabeth Galyn Martinez

(57) ABSTRACT

A navigating device includes: a camera configured to capture images within a field of view, the field of view depicting a scene including humans; a feature module configured to generate feature vectors based on the scene of humans in the images and to specify latent vectors that summarize movement of the humans in the scene based only on the camera images, the feature vectors summarizing the movement of the humans in the scene, and the latent vectors capturing a latent representation of trajectories in the scene of humans; a policy module configured to generate actions to be taken by the navigating device to navigate the scene of humans based on the feature vectors; and a propulsion control module configured to control one or more propulsion devices of the navigating device based on the actions to be taken generated by the policy module to navigate the scene of humans.

26 Claims, 10 Drawing Sheets

(56) References Cited

U.S. PATENT DOCUMENTS

2022/0292699 A1* 9/2022 Zhu ........................... G06T 7/90
2023/0109398 A1* 4/2023 Kranski ................. B25J 9/1615
700/250

OTHER PUBLICATIONS

CN 112631296 A Merged text and image (Year: 2021).*

Abduallah Mohamed, Kun Qian, Mohamed Elhoseiny, and Christian Claudel. Social-stgcnn: A social spatiotemporal graph convolutional neural network for human trajectory prediction. In Proceedings of the IEEE/CVF Conference on Computer Vision and Pattern Recognition, pp. 14424-14432, 2020.

Adarsh Jagan Sathyamoorthy, Jing Liang, Utsav Patel, Tianrui Guan, Rohan Chandra, and Dinesh Manocha. Densecavoid: Real-time navigation in dense crowds using anticipatory behaviors. In 2020 IEEE International Conference on Robotics and Automation (ICRA), pp. 11345-11352. IEEE, 2020.

Alexey Bochkovskiy, Chien-Yao Wang, and Hong-Yuan Mark Liao. Yolov4: Optimal speed and accuracy of object detection. arXiv preprint arXiv:2004.10934, 2020.

Andrey Rudenko, Luigi Palmieri, Michael Herman, Kris M Kitani, Dariu M Gavrila, and Kai O Arras. Human motion trajectory prediction: A survey. The International Journal of Robotics Research, 39(8):895-935, 2020.

Antoine Tordeux, Mohcine Chraibi, Armin Seyfried, and Andreas Schadschneider. Prediction of pedestrian dynamics in complex architectures with artificial neural networks. *Journal of intelligent transportation systems*, 24(6):556-568, 2019.

Ashish Kumar, Zipeng Fu, Deepak Pathak, and Jitendra Malik. RMA: Rapid motor adaptation for legged robots. In Robotics: Science and Systems XVII, Virtual Event, Jul. 12-16, 2021, 2021.

Ashish Vaswani, Noam Shazeer, Niki Parmar, Jakob Uszkoreit, Llion Jones, Aidan N Gomez, Lukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pp. 5998-6008, Curran Associates, Inc., 2017.

Benjamin Eysenbach, Ruslan R Salakhutdinov, and Sergey Levine. Robust predictable control. *Advances in Neural Information Processing Systems*, 34, 2021.

Bj¨rn Lutjens, Michael Everett, and Jonathan P How. Safe reinforcement learning with model uncertainty estimates. In 2019 International Conference on Robotics and Automation (ICRA), pp. 8662-8668. IEEE, 2019.

Bochkovskiy, et al., Yolov4: Optimal Speed and Accuracy of Object Detection, arXiv preprint, arXiv:2004.10934, 2020.

Brian D Ziebart, Nathan Ratliff, Garratt Gallagher, Christoph Mertz, Kevin Peterson, J Andrew Bagnell, Martial Hebert, Anind K Dey, and Siddhartha Srinivasa. Planning-based prediction for pedestrians. In 2009 IEEE/RSJ International Conference on Intelligent Robots and Systems, pp. 3931-3936. IEEE, 2009.

Changan Chen, Yuejiang Liu, Sven Kreiss, and Alexandre Alahi. Crowd-robot interaction: Crowd-aware robot navigation with attention-based deep reinforcement learning. In 2019 International Conference on Robotics and Automation (ICRA), pp. 6015-6022. IEEE, 2019.

Christoforos Mavrogiannis, Francesca Baldini, Allan Wang, Dapeng Zhao, Pete Trautman, Aaron Steinfeld, and Jean Oh. *Core Challenges of Social Robot Navigation: A Survey.* ArXiv, Mar. 2021. URL https://arxiv.org/abs/2103.05668v2.

Christoph Rosmann, Frank Hoffmann, and Torsten Bertram. Integrated online trajectory planning and optimization in distinctive topologies. Robotics and Autonomous Systems, 88:142-153, 2017.

Claudia Perez-D'Arpino, Can Liu, Patrick Goebel, Roberto Martin-Martin, and Silvio Savarese. Robot navigation in constrained pedestrian environments using reinforcement learning. In *IEEE International Conference on Robotics and Automation (ICRA)*, pp. 1140-1146. IEEE, 2020.

Daniel Neimark, Omri Bar, Maya Zohar, and Dotan Asselmann. Video transformer network. In Proceedings of the IEEE/CVF International Conference on Computer Vision (ICCV) Workshops, pp. 3163-3172, Oct. 2021.

Dapeng Zhao and Jean Oh. Noticing motion patterns: A temporal cnn with a novel convolution operator for human trajectory prediction. IEEE Robotics and Automation Letters, 6(2):628-634, 2020.

David Lopez-Paz, Leon Bottou, Bernhard Scholkopf, and Vladimir Vapnik. Unifying distillation and privileged information. In *4th International Conference on Learning Representations, ICLR 2016*, 2016. URL https://arxiv.org/abs/1511.03643.

Dian Chen, Brady Zhou, Vladlen Koltun, and Philipp Krahenbuhl. Learning by cheating. In Conference on Robot Learning, pp. 66-75. PMLR, 2020.

Diederik P. Kingma and Jimmy Ba. Adam: A method for stochastic optimization. In 3rd International Conference on Learning Representations, ICLR 2015, San Diego, CA, USA, May 7-9, 2015, Conference Track Proceedings, 2015. URL http://arxiv.org/abs/1412.6980.

Dieter Fox, Wolfram Burgard, and Sebastian Thrun. The dynamic window approach to collision avoidance. IEEE Robotics & Automation Magazine, 4(1):23-33, 1997.

Dirk Helbing and Peter Molnar. Social force model for pedestrian dynamics. Physical review E, 51(5):4282, 1995.

Edgar Riba, Dmytro Mishkin, Daniel Ponsa, Ethan Rublee, and Gary Bradski. Kornia: an open source differentiable computer vision library for pytorch. In Winter Conference on Applications of Computer Vision, 2020. URL https://arxiv.org/pdf/1910.02190.pdf.

Elia Kaufmann, Antonio Loquercio, Rene Ranftl, Matthias Muller, Vladlen Koltun, and Davide Scaramuzza. Deep drone acrobatics. In Proceedings of Robotics: Science and Systems, Corvalis, Oregon, USA, Jun. 2020. doi: 10.15607/RSS.2020.XVI.040.

Fei Xia, William B Shen, Chengshu Li, Priya Kasimbeg, Micael Edmond Tchapmi, Alexander Toshev, Roberto Martin-Martin, and Silvio Savarese. Interactive Gibson benchmark: A benchmark for interactive navigation in cluttered environments. IEEE Robotics and Automation Letters, 5(2):713-720, 2020.

Franck Feurtey. Simulating the collision avoidance behavior of pedestrians. Master's thesis, University of Tokyo, Department of Electronic Engineering, 2000.

Geoffrey Hinton, Oriol Vinyals, and Jeff Dean. Distilling the knowledge in a neural network. *NIPS Deep Learning and Representation Learning Workshop*, 2015.

Gianluca Monaci, Michel Aractingi, Tomi Silander; "DiPCAN: Distilling Privileged Information for Crowd-Aware Navigation" Robotics: Science and Systems, New York, NY: Jun. 27-Jul. 1, 2022.

Jinyoung Choi, Kyungsik Park, Minsu Kim, and Sangok Seok. Deep reinforcement learning of navigation in a complex and crowded environment with a limited field of view. In 2019 International Conference on Robotics and Automation (ICRA), pp. 5993-6000. IEEE, 2019.

John Schulman, Filip Wolski, Prafulla Dhariwal, Alec Radford, and Oleg Klimov. Proximal policy optimization algorithms. arXiv preprint arXiv:1707.06347, 2017.

Joonho Lee, Jemin Hwangbo, Lorenz Wellhausen, Vladlen Koltun, and Marco Hutter. Learning quadrupedal locomotion over challenging terrain. Science robotics, 5 (47), 2020.

Judy Hoffman, Saurabh Gupta, and Trevor Darrell. Learning with side information through modality hallucination. In *Proceedings of the IEEE Conference on Computer Vision and Pattern Recognition*, pp. 826-834, 2016.

Jun Jin, Nhat M Nguyen, Nazmus Sakib, Daniel Graves, Hengshuai Yao, and Martin Jagersand. Mapless navigation among dynamics with social-safety-awareness: a reinforcement learning approach from 2d laser scans. In 2020 IEEE International Conference on Robotics and Automation (ICRA), pp. 6979-6985. IEEE, 2020.

Jur Van Den Berg, Stephen J Guy, Ming Lin, and Dinesh Manocha. Reciprocal n-body collision avoidance. In Robotics research, pp. 3-19. Springer, 2011.

Lei Tai, Jingwei Zhang, Ming Liu, and Wolfram Burgard. Socially compliant navigation through raw depth inputs with generative

(56)                    References Cited

OTHER PUBLICATIONS adversarial imitation learning. In 2018 IEEE International Conference on Robotics and Automation (ICRA), pp. 1111-1117. IEEE, 2018.

Lerrel Pinto, Marcin Andrychowicz, Peter Welinder, Wojciech Zaremba, and Pieter Abbeel. Asymmetric actor critic for image-based robot learning. RSS, 2017.

Linhai Xie, Sen Wang, Andrew Markham, and Niki Trigoni. Towards monocular vision based obstacle avoidance through deep reinforcement learning. In RSS 2017 workshop on New Frontiers for Deep Learning in Robotics, 2017.

Lucia Liu, Daniel Dugas, Gianluca Cesari, Roland Siegwart, and Renaud Dub'e. Robot navigation in crowded environments using deep reinforcement learning. In 2020 IEEE/RSJ International Conference on Intelligent Robots and Systems (IROS), pp. 5671-5677. IEEE, 2020.

Maks Sorokin, Jie Tan, C. Karen Liu, and Sehoon Ha. Learning to navigate sidewalks in outdoor environments, 2021.

Maren Bennewitz, Wolfram Burgard, Grzegorz Cielniak, and Sebastian Thrun. Learning motion patterns of people for compliant robot motion. The International Journal of Robotics Research, 24(1):31-48, 2005.

Mark Pfeiffer, Michael Schaeuble, Juan Nieto, Roland Siegwart, and Cesar Cadena. From perception to decision: A data-driven approach to end-to-end motion planning for autonomous ground robots. In 2017 IEEE International Conference on Robotics and Automation (ICRA), pp. 1527-1533. IEEE, 2017.

Michael Everett, Yu Fan Chen, and Jonathan P How. Collision avoidance in pedestrian-rich environments with deep reinforcement learning. IEEE Access, 9:10357-10377, 2021.

Noel E Du Toit and Joel W Burdick. Robot motion planning in dynamic, uncertain environments. IEEE Transactions on Robotics, 28(1):101-115, 2011.

Nuno C Garcia, Pietro Morerio, and Vittorio Murino. Modality distillation with multiple stream networks for action recognition. In *Proceedings of the European Conference on Computer Vision (ECCV)*, pp. 103-118, 2018.

Parth Kothari, Sven Kreiss, and Alexandre Alahi. Human trajectory forecasting in crowds: A deep learning perspective. IEEE Transactions on Intelligent Transportation Systems, 2021.

Patrick Wenzel, Torsten Schon, Laura Leal-Taixe, and Daniel Cremers. Vision-based mobile robotics obstacle avoidance with deep reinforcement learning. In 2021 IEEE International Conference on Robotics and Automation (ICRA), 2021.

Pete Trautman, Jeremy Ma, Richard M Murray, and Andreas Krause. Robot navigation in dense human crowds: Statistical mod-els and experimental studies of human-robot cooperation. The International Journal of Robotics Research, 34(3):335-356, 2015.

Steve Macenski, Francisco Martin, Ruffin White, and Jonatan Gines Clavero. The marathon 2: A navigation system. In 2020 IEEE/RSJ International Conference on Intelligent Robots and Systems (IROS), pp. 2718-2725. IEEE, 2020.

Sujeong Kim, Stephen J Guy, Wenxi Liu, David Wilkie, Rynson WH Lau, Ming C Lin, and Dinesh Manocha. Brvo: Predicting pedestrian trajectories using velocityspace reasoning. The International Journal of Robotics Research, 34(2):201-217, 2015.

Tingxiang Fan, Xinjing Cheng, Jia Pan, Pinxin Long, Wenxi Liu, Ruigang Yang, and Dinesh Manocha. Getting robots unfrozen and unlost in dense pedestrian crowds. IEEE Robotics and Automation Letters, 4(2):1178-1185, 2018.

Tuong Do, Thanh-Toan Do, Huy Tran, Erman Tjiputra, and Quang D Tran. Compact trilinear interaction for visual question answering. In *Proceedings of the IEEE/CVF International Conference on Computer Vision,* pp. 392-401, 2019.

Varun Tolani, Somil Bansal, Aleksandra Faust, and Claire Tomlin. Visual navigation among humans with optimal control as a supervisor. IEEE Robotics and Automation Letters, 6(2):2288-2295, 2021. doi: 10.1109/LRA.2021. 3060638.

Vladimir Vapnik and Akshay Vashist. A new learning paradigm: Learning using privileged information. Neural networks, 22(5-6):544-557, 2009.

Volodymyr Mnih, Koray Kavukcuoglu, David Silver, Andrei A. Rusu, Joel Veness, Marc G. Bellemare, Alex Graves, Martin Riedmiller, Andreas K. Fidjeland, Georg Ostrovski, Stig Petersen, Charles Beattie, Amir Sadik, Ioannis Antonoglou, Helen King, Dharshan Kumaran, Daan Wierstra, Shane Legg, and Demis Hassabis. Human-level control through deep reinforcement learning. *Nature,* 518(7540):529-533, Feb. 2015. URL http://dx.doi.org/10.1038/nature14236.

Wolfram Burgard, Armin B Cremers, Dieter Fox, Dirk H"ahnel, Gerhard Lakemeyer, Dirk Schulz, Walter Steiner, and Sebastian Thrun. The interactive museum tour-guide robot. In Aaai/Iaai, pp. 11-18, 1998.

Yifan Liu, Ke Chen, Chris Liu, Zengchang Qin, Zhenbo Luo, and Jingdong Wang. Structured knowledge distillation for semantic segmentation. In *Proceedings of the IEEE/CVF Conference on Computer Vision and Pattern Recognition,* pp. 2604-2613, 2019.

Zhiming Chen, Tingxiang Fan, Xuan Zhao, Jing Liang, Cong Shen, Hua Chen, Dinesh Manocha, Jia Pan, and Wei Zhang. Autonomous social distancing in urban environments using a quadruped robot. *IEEE Access,* 9:8392-8403, 2021.

* cited by examiner

704

Start

Jointly Train Policy And Encoder Using Reinforcement Learning And Privileged Training Data

708

Train Feature Module Using Non-Privileged Training Data To Minimize Difference Between Feature Vectors Generated By The Feature Module And Feature Vectors Generated By Encoder End

DISTILLING INFORMATION FOR CROWD-AWARE ROBOT NAVIGATION

CROSS-REFERENCE TO RELATED APPLICATIONS

This application claims the benefit of U.S. Provisional Application No. 63/338,614, filed on May 5, 2022. The entire disclosure of the application referenced above is incorporated herein by reference.

FIELD

The present disclosure relates to robots and more particularly to systems and methods for training robots for crowd aware navigation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination.

Navigating robots may need to navigate in crowded environments to perform services. Robot control could decouple human motion prediction from robot movement planning. Humans could be treated as non-responsive obstacles, which result in unnatural behaviors that cause the robot to, for example, block human paths or to move in a way that surprises a human, who in term reacts unpredictably, creating a short oscillatory interaction that may be referred to as the reciprocal dance phenomenon. Alternatively, human paths may be predicted before planning a robot's motion. These systems may be computationally complex, however, and the predicted trajectories may fill a large portion of the space, which may cause a robot to freeze and wait for humans to clear.

There is a need for robot motion control without the need for a light detection and ranging (LIDAR) sensor to navigate spaces that are crowded with humans without colliding with humans and without freezing and avoiding unnecessary oscillatory dances with humans.

SUMMARY

In a feature, a navigating device includes: a camera configured to capture images within a field of view of the navigating device, the field of view depicting a scene including humans; a feature module configured to generate feature vectors based on the scene of humans in the images captured by the camera and to specify latent vectors that summarize movement of the humans in the scene based only on the camera images, the feature vectors summarizing the movement of the humans in the scene, and the latent vectors capturing a latent representation of trajectories in the scene of humans; a policy module configured to generate actions to be taken by the navigating device to navigate the scene of humans based on the feature vectors; and a propulsion control module configured to control one or more propulsion devices of the navigating device based on the actions to be taken generated by the policy module to navigate the scene of humans.

In further features, the navigating device is one of a robot and an autonomous vehicle.

In further features, the policy module is trained jointly with an encoder module using reinforcement learning, the encoder module being configured to generate feature vectors based on training data including positions of humans; and where the feature module is trained using supervised learning to approximate the output of the encoder module based on training data without explicit positions of humans.

In further features, the policy module is trained jointly with the feature module using reinforcement learning based on training data that includes detections of humans without explicit positions of humans.

In a feature, a navigating robot includes: a camera configured to capture images within a field of view in front of the navigating robot; a feature module configured to generate feature vectors based on humans in the images; a policy module configured to generate actions to be taken by the navigating robot based on the feature vectors; and a propulsion control module configured to control one or more propulsion devices of the navigating robot based on the actions to be taken, where the policy module is trained jointly with an encoder module using reinforcement learning, the encoder module being configured to generate feature vectors based on training data including positions of humans; and the feature module is trained using supervised learning based on training data that does not include positions of humans.

In further features, the policy module and the encoder module are trained jointly using a proximal policy optimization (PPO) algorithm based on maximizing a reward.

In further features, the feature module is trained using supervised learning based on training data that does not include positions of humans and that includes depth images.

In further features, the feature module is trained based on minimizing a loss determined based on differences between (a) outputs of the feature module generated based on samples of the training data, respectively, and (b) stored outputs associated with the ones of the samples, respectively.

In further features, the feature module includes: a convolutional neural network (CNN) module; a flattening module; an attention module; and a multilayer perceptron (MLP) module configured to generate the feature vectors.

In further features: the CNN module is configured to extract features from the depth images; and the MLP module configured to generate the feature vectors based on outputs of the attention module.

In further features, the feature module is trained using supervised learning based on training data that does not include positions of humans and that includes detections of humans.

In further features, a detector module is configured to generate the detections in the images.

In further features, the detector module is configured to generate the detections using the YOLOv4 detector algorithm.

In further features, the feature module includes: a first multilayer perceptron (MLP) module configured to receive the detections; a concatenation module; a second MLP module; an attention module; and a third MLP module configured to generate the feature vectors.

In further features, the navigating robot does not include any light detection and ranging (LIDAR) sensors.

In a feature, a training system includes: a training dataset including: privileged training samples including positions of humans in images; and non-privileged training samples that do not include positions of humans and that include one of (a) detections of humans in images and (b) depth images including humans; and a training module configured to: during a first portion of training, jointly train an encoder module and a policy module for a navigating robot using reinforcement learning based on ones of the privileged training samples of the training dataset, where the policy module is configured to generate actions to be taken by the navigating robot based on feature vectors generated by a feature module, and where the feature module is configured to generate the feature vectors based on humans in images captured using a camera of the navigating robot; and during a second portion of the training after the first portion of the training, train the feature module based on ones of the non-privileged training samples.

In further features, the training module is configured to, during the second portion of the training, train the feature module using supervised learning.

In further features, the training module is configured to jointly train the policy module and the encoder module during the first portion of the training using a proximal policy optimization (PPO) algorithm based on maximizing a reward.

In further features, the non-privileged training samples include one of (a) detections of humans in images and (b) depth images including humans.

In further features, the training module is configured to train the feature module during the second portion of the training based on minimizing a loss determined based on differences between (a) outputs of the feature module generated based on ones of the non-privileged training samples, respectively, and (b) stored outputs associated with the ones of the non-privileged training samples, respectively.

In a feature, a navigating robot includes: a camera configured to capture images within a field of view in front of the navigating robot; a feature module configured to generate feature vectors based on humans in the images; a policy module configured to generate actions to be taken by the navigating robot based on the feature vectors; and a propulsion control module configured to control one or more propulsion devices of the navigating robot based on the actions to be taken; where the policy module is trained jointly with the feature module using reinforcement learning based on training data that includes detections of humans without explicit positions of humans.

In further features, the feature module is configured to: generate detections of humans in images using the YOLOv4 detector algorithm; and generate the feature vectors based on the detections.

In further features, the policy module and the feature module are trained using a proximal policy optimization (PPO) algorithm based on maximizing a reward.

In a feature, a training system includes: a training dataset including: non-privileged training samples that do not include positions of humans and that include detections of humans in images; and a training module configured to: jointly train a feature module and a policy module for a navigating robot using reinforcement learning based on ones of the non-privileged training samples of the training dataset using reinforcement learning, where the policy module is configured to generate actions to be taken by the navigating robot based on feature vectors generated by the feature module, and where the feature module is configured to generate the feature vectors based on detections of humans in images captured using a camera of the navigating robot.

In further features, the training module is configured to jointly train the policy module and the feature module using a proximal policy optimization (PPO) algorithm based on maximizing a reward.

In a feature, a navigating method includes: by a camera, capturing images within a field of view of a navigating device, the field of view depicting a scene including humans; generating feature vectors based on the scene of humans in the images captured by the camera and specifying latent vectors that summarize movement of the humans in the scene based only on the camera images, the feature vectors summarizing the movement of the humans in the scene, and the latent vectors capturing a latent representation of trajectories in the scene of humans; generating actions to be taken by the navigating device to navigate the scene of humans based on the feature vectors; and actuating one or more propulsion devices of the navigating device based on the actions to be taken to navigate the scene of humans.

In a feature, a navigating method includes: by a camera capturing images within a field of view in front of a navigating robot; by a feature module, generating feature vectors based on humans in the images; by a policy module, generating actions to be taken by the navigating robot based on the feature vectors; and controlling one or more propulsion devices of the navigating robot based on the actions to be taken, where the policy module is trained jointly with an encoder module using reinforcement learning, the encoder module being configured to generate feature vectors based on training data including positions of humans; and the feature module is trained using supervised learning based on training data that does not include positions of humans.

In a feature, a training method includes: during a first portion of training, jointly train an encoder module and a policy module for a navigating robot using reinforcement learning based on ones of privileged training samples of a training dataset, where the training dataset includes: the privileged training samples including positions of humans in images; and non-privileged training samples that do not include positions of humans and that include one of (a) detections of humans in images and (b) depth images including humans; and where the policy module is configured to generate actions to be taken by the navigating robot based on feature vectors generated by a feature module, and where the feature module is configured to generate the feature vectors based on humans in images captured using a camera of the navigating robot; and during a second portion of the training after the first portion of the training, training the feature module based on ones of the non-privileged training samples.

In a feature, a navigating method includes: by a camera, capturing images within a field of view in front of a navigating robot; by a feature module, generating feature vectors based on humans in the images; by a policy module, generating actions to be taken by the navigating robot based on the feature vectors; and controlling one or more propulsion devices of the navigating robot based on the actions to be taken; where the policy module is trained jointly with the feature module using reinforcement learning based on training data that includes detections of humans without explicit positions of humans.

In a feature, a training method includes: train a feature module for a navigating robot using reinforcement learning based on ones of non-privileged training samples of a training dataset, where the non-privileged training samples do not include positions of humans and include detections of humans in images; jointly with the training of the feature module, training a policy module for the navigating robot using reinforcement learning based on the ones of the non-privileged training samples of the training dataset using reinforcement learning, where the policy module is configured to generate actions to be taken by the navigating robot based on feature vectors generated by the feature module, and where the feature module is configured to generate the feature vectors based on detections of humans in images captured using a camera of the navigating robot.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present application involves point-goal navigation of a robot in a crowded environment. A robot's goal is to reach a goal location given as a position relative to the robot pose while avoiding colliding with one or more humans. Only a narrow field of view (FOV) is used by the robot (e.g., a forward facing RGB-D camera). Estimation of the state of surrounding humans is not performed.

The present application involves systems and methods to bridge a gap between crowd trajectory prediction and realistic robot control using only a narrow FOV robot sensor (e.g., camera) without requiring accurate estimation of human positions and without any LIDAR sensors. In an example, two phases of training are used. During a first phase of training, an encoder and a policy are jointly trained with privileged information regarding human positions (i.e., accurate pedestrian positions, velocities and accelerations) using reinforcement learning. During a second phase of the training, a feature module (configured to output feature vectors that approximate feature vectors produced using privileged information) is trained using supervised learning. In another example in which training is accomplished in one phase, a feature extractor and a policy are jointly trained using reinforcement learning with information regarding human positions derived using object detection.

Generally, supervised learning trains using data that minimizes a loss based on a difference between an output generated based on an input and an expected output for the input (i.e., a known correct answer), whereas reinforcement learning trains using an agent that is rewarded depending on how appropriate an output is for a given input (i.e., learns to produce output that maximizes future rewards). Each example has advantages. The first example may be more performant due to the use of privileged information with reinforcement learning, the second example is in trained in one learning phase instead of two learning phases. More specifically, while the first example includes a relatively easier reinforcement learning phase due to the use of privileged information and a subsequent supervised learning phase, the second example includes a single reinforcement learning phase that uses less-privileged information (i.e., images instead of accurate positions and velocities etc.) which makes learning more difficult.

Figure 1:
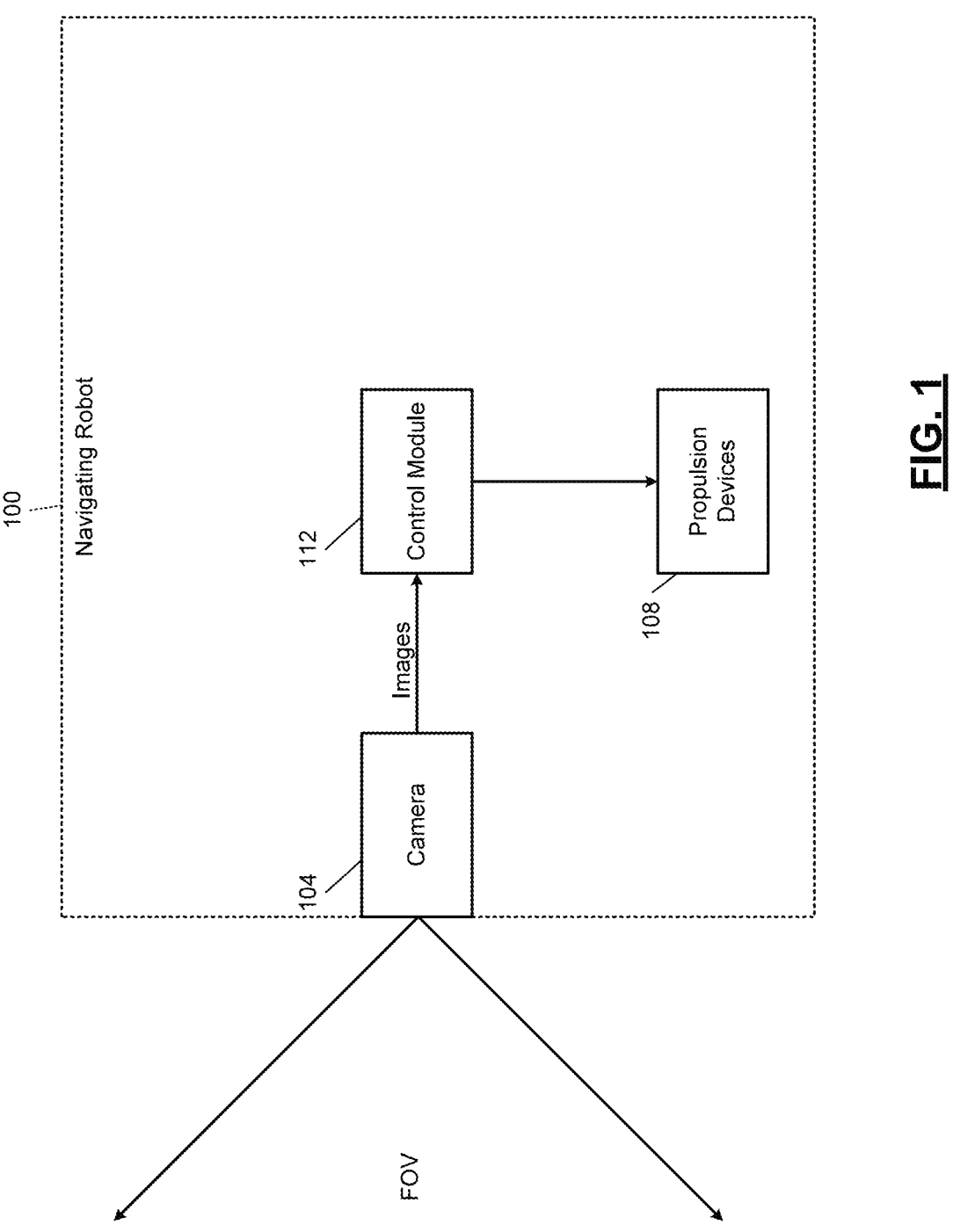
FIG. 1 is a functional block diagram of an example implementation of a navigating robot.

FIG. 1 is a functional block diagram of an example implementation of a navigating robot 100. The navigating robot 100 is a mobile vehicle. The navigating robot 100 includes a camera 104 that captures images within a predetermined field of view (FOV) in front of the navigating robot 100. The operating environment of the navigating robot 100 may be an indoor space, an outdoor space, or both indoor spaces and outdoor spaces. The navigating robot 100 may not include any other cameras and does not include any LIDAR, radar, or ultrasonic sensors.

The camera 104 may be, for example, a red, green, blue (RGB) camera, or another suitable type of camera. In various implementations, the camera 104 may also capture depth (D) information, such as in the example of a RGB-D camera. The camera 104 may be fixed to the navigating robot 100 such that the orientation and FOV of the camera 104 relative to the navigating robot 100 remains constant. The camera 104 may have a resolution of 360×640 pixels or another suitable resolution. The depth channel of the camera 104 may be down sampled, such as to 90×160 pixels or another suitable resolution.

The navigating robot 100 includes one or more propulsion devices 108, such as one or more wheels, one or more treads/tracks, one or more moving legs, one or more propellers, and/or one or more other types of devices configured to move the navigating robot 100 forward, backward, right, and left. One or a combination of two or more of the propulsion devices 108 may be used to propel the navigating robot 100 forward or backward, to turn the navigating robot 100 right, or to turn the navigating robot 100 left.

The navigating robot 100 includes a control module 112 configured to control movement of the navigating robot 100 from a present location to a goal location without colliding with any humans (or other objects) using images from the camera 104. The camera 104 may update at a predetermined frequency, such as 60 hertz (Hz), 120 Hz, or another suitable frequency. As discussed further below, the control module 112 is trained to move the navigating robot 100 without estimating human position or movement trajectory with without the robot 100 including a LIDAR sensor.

The control module 112 is configured to control the propulsion devices 108 to navigate (e.g., move the entire robot 100 and not just an end effector) to the goal location without colliding based on the images. For example, based on one or more of the images, the control module 112 may determine an action to be taken by the navigating robot 100. For example, the control module 112 may actuate the propulsion devices 108 to move the navigating robot 100 forward by a predetermined distance under some circumstances. The control module 112 may actuate the propulsion devices 108 to move the navigating robot 100 backward by a predetermined distance under some circumstances. The control module 112 may actuate the propulsion devices 108 to turn the navigating robot 100 to the right by the predetermined angle under some circumstances. The control module 112 may actuate the propulsion devices 108 to turn the navigating robot 100 to the left by the predetermined angle under some circumstances. The control module 112 may not actuate the propulsion devices 108 to not move the navigating robot 100 under some circumstances. The control module 112 actuates (or does not actuate) the propulsion devices 108 to avoid the navigating robot 100 contacting any objects.

Figure 2:
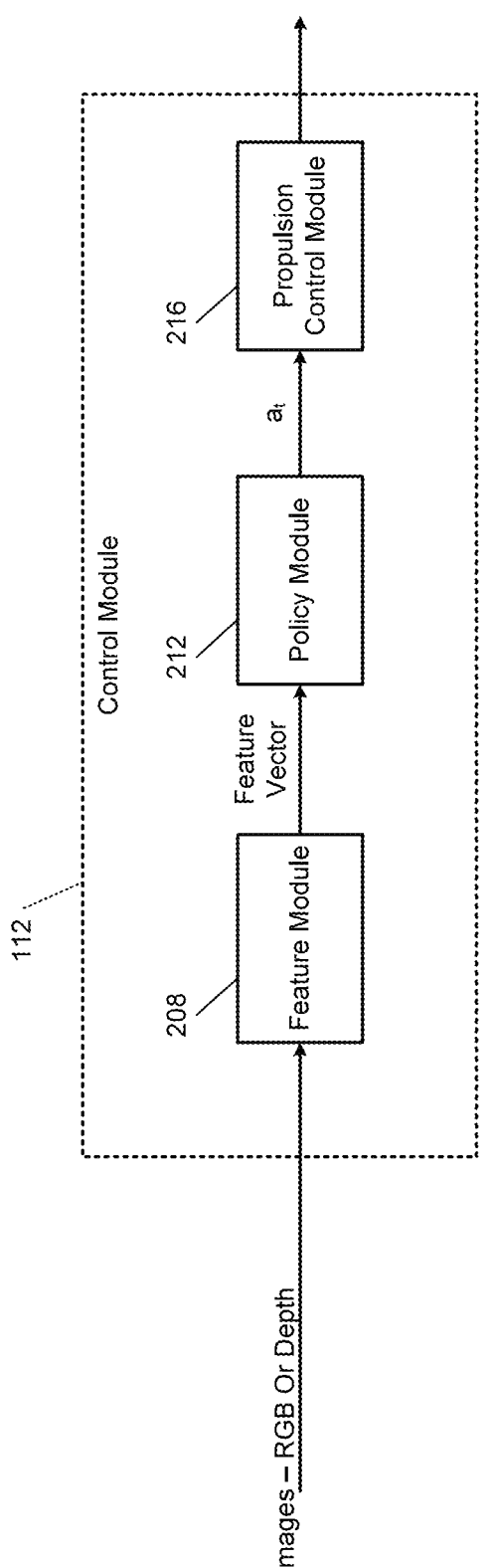
FIG. 2 is a functional block diagram of an example implementation of a control module of the navigating robot.

FIG. 2 is a functional block diagram of an example implementation of the control module 112 after training. The training is discussed further below.

The feature module 208 is configured to generate a feature vector for an image. The feature module 208 is trained as described below. The feature vector has a dimension of less than a predetermined dimension, such as 100 or another suitable dimension.

Based on the feature vector and a present robot state, a policy module 212 determines a next action (at) for the robot to take. The action may be, for example, move forward by the predetermined distance, move backward by the predetermined distance, move right by the predetermined distance, move left by the predetermined distance, or not move. A propulsion control module 216 controls the actuator to execute the action to be taken.

Point to goal navigation in an environment with humans present is complex. At time t, the robot state $s_t$ includes position $(x_t, y_t)$ and heading $(\psi_t)$ of the robot $s_t=[x_t,y_t,\psi_t]$. The goal position/location of the robot may be described relative to the initial position of the robot by $g=[\Delta x^g,\Delta y^g]$. Movement of the robot is controlled (by the propulsion control module 216) with velocity commands $u_t=[v_t, w_t]$ where $v_t \in [-v_{max}, v_{max}]$ is the linear velocity of the robot and $w_t \in [-w_{max},w_{max}]$ is the angular velocity. The robot may be modeled by a three dimensional non-linear system with dynamics $$\dot{x} = v \cdot \cos(\psi), \, \dot{y} = v \cdot \sin(\psi), \, \dot{\psi} = w.$$

Figure 3:
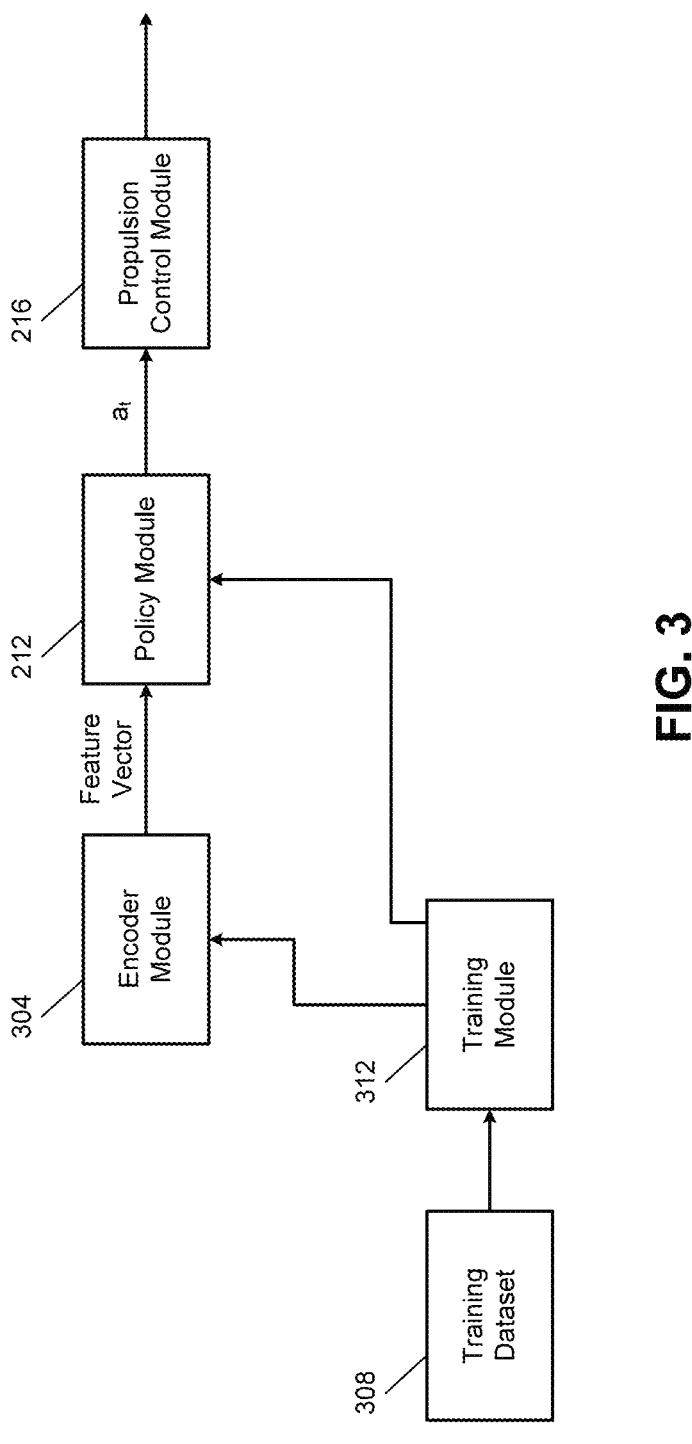
FIG. 3 is a functional block diagram of a training system for a first portion of training.
Figure 4:
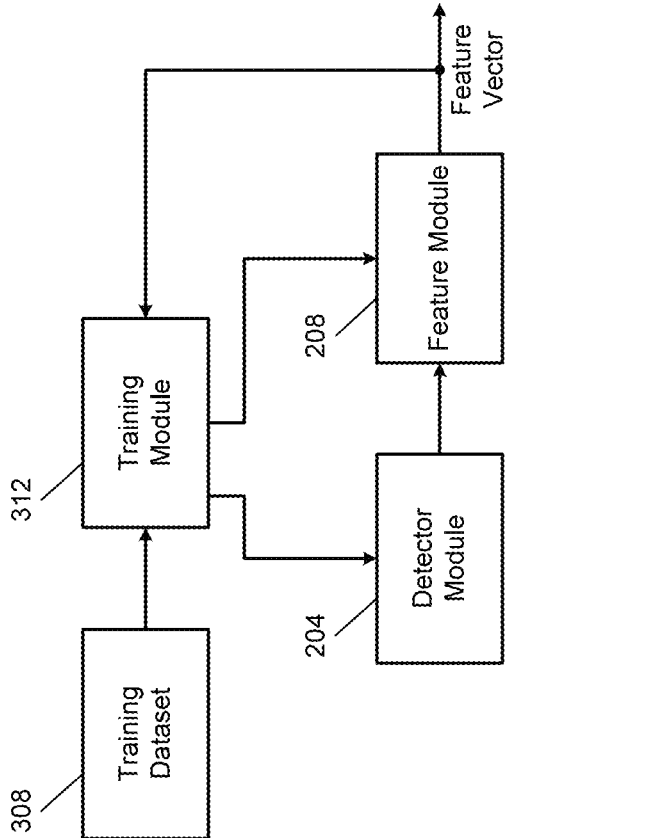
FIG. 4 is a functional block diagram of a training system for a second portion of training.

FIG. 3 is a functional block diagram of a first portion of training. FIG. 4 is a functional block diagram of a second portion of the training performed after the first portion. In the first portion of the training, an encoder module 304 and the policy module 212 are jointly (concurrently) trained using reinforcement learning (RL) based on privileged training data stored in a training dataset 308. Similar to the feature module 208, the encoder module 304 generates feature vectors based on input samples of privileged training data, respectively. The privileged training data includes known human locations, speeds, directions, and other information regarding movement of humans. The encoder module 304 generates a feature vector $(z_t)$ based on each sample of privileged training data input. A training module 312 inputs training data to the encoder module 304 and the policy module 212 and updates trainable parameters of the encoder module 304 and the policy module 212 to train the encoder module 304 and the policy module 212.

The encoder module 304 ($\mu$) is configured to encode the privileged information $p_t$ about the (human) crowd situation around the robot into a feature vector $(z_t)$. A non-grid based method may be used for the privileged training data that includes position, velocity, and acceleration of humans relative to the robot. The input privileged information $p_t$ may be expressed by $p_t \in \mathbb{R}^{24}$ by concatenating 6 dimensional (6-D) vectors representing relative position, velocity, and acceleration of the N (e.g., 4) closest humans in front of the robot within a predetermined horizontal FOV (e.g., 90 degrees) of the camera and closer than a predetermined distance (e.g., 10 meters) from the robot. The 6-D vector corresponding to each human is embedded/encoded by the encoder module 304 using a first multilayer perceptron (MLP) network of the encoder module 304 and concatenated before being input to a second MLP network of the encoder module 304 that generates the feature (context) vector $z_t$, $z_t \in \mathbb{R}^{16}$ based on the concatenation. While the example of MLP networks is provided, another suitable type of artificial neural network may be used, however, the architecture discussed above including the two MLP networks may perform better than other architectures yet be relatively simple complexity wise.

The policy module 212 includes a policy $\pi$ that determines the next actions based on two inputs (a) a feature vector $(z_t$ from the encoder module 304 during the first portion of the training and feature vector $\hat{z}_t$ from the feature module 208 during the second portion of the training and during operation/runtime of the robot) and (b) the non-privileged training input (vector) $n_t$ descriptive of the robot state and distance to the goal location. The non-privileged training input at time t can be described as $$n_t = [d_t \cos(\theta_t), \sin(\theta_t), \dot{x}, \dot{y}, \dot{\psi}].$$

dt is the Euclidean distance between the robot position at time t and the goal location, $\theta_t$ is an angle to the goal position relative to the robot's present heading $\psi$, and $\dot{x},\dot{y},\dot{\psi}$ are linear and angular velocities.

The policy module 212 concatenates the non-privileged training input $n_t$ with the feature vector $z_t$, which is computed from the privileged training input to the encoder module 304 during the first portion of the training. The policy module 212 determines the next action to be performed by the robot based on the non-privileged training input $n_t$ and the feature vector $z_t$, such as follows $$a_t = \pi(n_t, \mu(p_t)).$$

As stated above, the next action may be go forward, go backward, turn left, turn right, or not move. The policy module 212 or the propulsion control module 216 convert the next action into velocity commands $u_t=[v_t, \omega_t]$.

The policy module 212 (e.g., the policy if) may include a MLP network including hidden layers of size 32 or another suitable type of policy. The training module 312 trains the policy jointly with the encoder module 304 during the first portion of the training using RL by maximizing an expected return using a proximal policy optimization (PPO) algorithm. Training using the PPO algorithm may provide a more pragmatic end-to-end solution for crowd aware navigation than other types of PPO.

Jointly training the policy module 212 and the encoder module 304 ensures that the context vector generated by $\mu$ includes relevant information for the policy $\pi$. The training module 312 may perform the first portion of the training using a simulation environment, such as the iGibson simulation environment or another suitable type of simulation environment. Humans may follow one or more motion models during the training, such as pseudo-random time-correlated motion and the ORCA model of motion. The training module 312 may implement a random number of humans into the simulation environment with some humans being stationary and others moving. For example, in 20 percent of training experiments all humans may be not moving (static), in 20 percent of the training experiments, humans may be moving according to one motion model (e.g., the pseudo-random time-correlated motion model), and in 60 percent of the training experiments humans may be moving according to another motion model (e.g., the ORCA model). Other percentages and other motion models may be used. In training experiments using moving humans, a predetermined percent of the humans (e.g., up to 40 percent) may not be moving (static). When using random or pseudo-random motion models, a predetermined percentage (e.g., up to 40 percent) of the humans may not perceive the robot to account for possible non-cooperative human behavior with the robot during operation of the robot. Human target speed may be randomized, such as by uniformly sampling the target speed for each human at time step from $v_{ped} \in [0.2, 1.2]$ m/s (meters per second). The training module 312 may initialize humans at random positions within the simulation environment within, for example, a 10 m×10 m square area around the robot's present location and given a goal location at a random location within that square area. The training module 312 may assign a new goal location for each human once the human reaches its goal location. The training module 312 may set the start and goal locations, such as randomly, and may be constrained to be at least a minimum distance (e.g., 12 m) and on opposite sides of the square area where the humans move.

The PPO algorithm used by the training module 312 to train the policy module 212 and the encoder module 304 during the first portion of the training to maximize the expected return can be described by $$J(\pi) = \mathbb{E}_\pi \left[ \sum_{t=0}^{T} \gamma^t r_t \right],$$

where T=a predetermined number of (e.g., 1200) steps in the episode's horizon, $\gamma$ is a predetermined value (e.g., 0.99) and is a discount factor, and the reward $r_t$ for each time step t is computed as $$r_t = \begin{cases} 0.5 & \text{if success to goal without collision} \\ -0.5 & \text{if collision with a human} \\ -0.2 * r_t^y + 0.1 * r_t^p & \text{otherwise} \end{cases}$$

$$r_t^y$$

is a space violation term and may be set to 1 of the robot gets within a predetermined distance (e.g., 0.5 meters) from a human and 0 otherwise.

$$r_t^p$$

is a potential reward that encourages the robot to move toward the goal location and may be determined by the training module as $$r_t^p = d_t - d_{t-1},$$

where dt is the Euclidean distance between the robot and the goal position at time t.

A predetermined number of steps (e.g., 10 million steps) may be used for the first portion of the training with a predetermined learning rate, such as 1e-4). A number of humans in the environment may be sampled from a distribution, such as a uniformly random distribution, in the interval $[0.7 * \eta_{hum}, 1.3\eta_{hum}]$. Training may start with $\eta_{hum}=5$, and the number of humans may be increased (e.g., linearly) every predetermined number of steps (e.g., every 600,000 steps) until $\eta_{hum}$ reaches a predetermined value, such as 20.

After the training of the policy module 212 and the encoder module 304, the training module 312 performs the second portion of the training illustrated in FIG. 4 and trains the feature module 208. The privileged information used by the encoder module 304 is not available to the feature module 208 during robot operation. The training module 312 trains the feature module 208 using non-privileged training data, such as RGB and/or depth images from the camera 104.

The training module 312 trains the feature module 208 using supervised learning to minimize a difference between the feature vector $\hat{z}_t$ generated by the feature module 208 for a given input and the known/stored feature vector $z_t$ generated by the encoder module 304 for that input. The training module 312 trains the feature module 208 to reason about human motion using stored training image data without detecting and tracking human positions in the training image data using detections from an object detection module, such as the YOLOv4 object detector.

The feature module 208 does not determine the privileged information including human positions. Depending on the sensor configuration of the robot, it may be possible to use different types of non-privileged information for the second portion of the training. Two example architectures for the feature module 208 are described: (a) an architecture that uses and is trained on a history of depth images; and (b) an architecture that uses and is trained on a history of human detections (e.g., from an object detection module) in RGB images. The difference between real and synthetically generated data may be small in the case of depth images or detections. Regarding depth images, since illumination and texture effects are not included, a reality gap to bridge may be easier than between real and synthetic color images. The detections may have comparable performances in real images and in a simulation environment. In the first architecture, the feature module 208 may include a convolutional neural network (CNN) followed by an attention mechanism (e.g., having the transformer architecture) followed by one or more fully connected layers. In the second architecture, the feature module 208 may include a fully connected layer followed by an attention mechanism (e.g., having the transformer architecture) with windowing followed by one or more fully connected layers. Transformer architecture as used herein is described in Ashish Vaswani, Noam Shazeer, Niki Parmar, Jakob Uszkoreit, Llion Jones, Aidan N Gomez, Łukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. Additional information regarding the transformer architecture can be found in U.S. Pat. No. 10,452,978, which is incorporated herein in its entirety.

Generally stated attention mechanisms/modules in the transformer architecture allow for the amplification of relevant signals in a neural network, similar to the way a human is able to intuitively focus on certain parts of an image and know what is important. Self-attention mechanisms are attention mechanisms that relate different positions of a sequence (e.g., determining correlation of words in a sentence, such as a question). Transformer mechanisms are one way to implement a self-attention mechanism that maps queries against a set of keys to present values, which together define an embedding matrix.

The input to the feature module 208 having the first architecture is depth images $h_t \in \mathbb{R}^{90 \times 1}$. The CNN may have a 2 dimensional (2D) spatial backbone for feature extraction from depth images. The CNN may include 3 layers with (number of input channels, number of output channels, kernel size, stride) equal to [1, 32, 8, 4], [32, 64, 4, 2], [64, 32, 3, 1], respectively or other suitable values. The output of the CNN may be flattened into a 1 dimensional (1D) vector which is fed into the attention mechanism (e.g., with a time window of 10 or another suitable time window). The output of the attention mechanism is input to an MLP module that, based on the input, generates the feature vector $\hat{z}_t = \mathbb{R}^{16}$. A functional block diagram of an example implementation of the first architecture is shown in FIG. 5A.

Figures 5A, 5B:
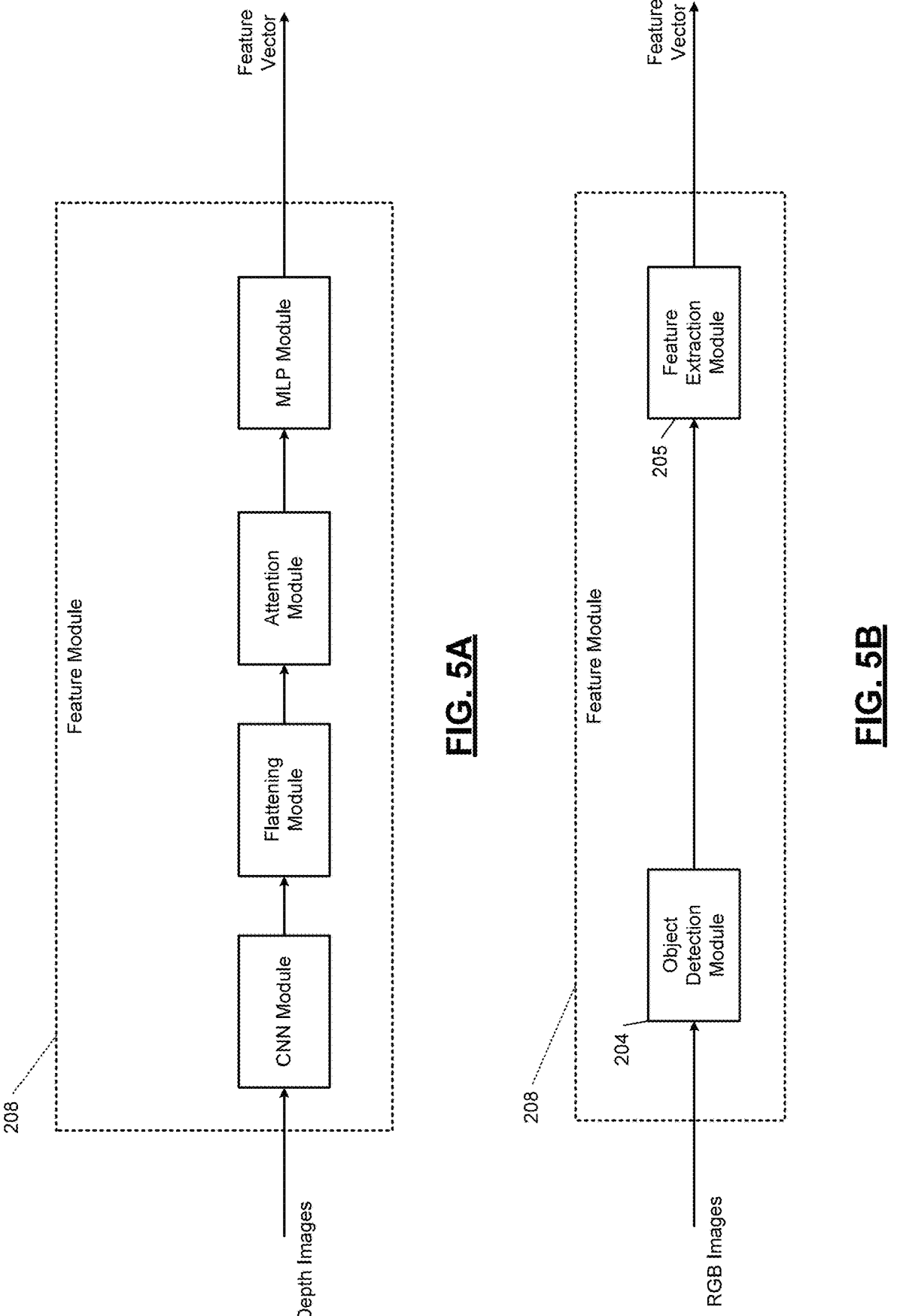
FIGS. 5A, 5B, and 6 are functional block diagrams of example architectures of a feature module.

In FIG. 5B there is shown one embodiment of the feature module 208 shown in FIG. 5A, in which an object detection module 204 detects humans in the images captured by the camera 104. The object detection module 204 may detect humans in the images, for example, using the YOLOv4 human detector or another suitable type of human detector. The YOLOv4 human detector is described in Bochkovskiy, et al., Yolov4: Optimal Speed and Accuracy of Object Detection, arXiv preprint, arXiv:2004.10934, 2020, which incorporated herein in its entirety. The object detection module 204 generates detections for the humans captured in each image. The detections may include feature position, size, and confidence of the bounding boxes of the detections. The detections output from the object detection module 204 are input to feature extraction module 205 which generates the feature vector based on the detections.

Figure 6:
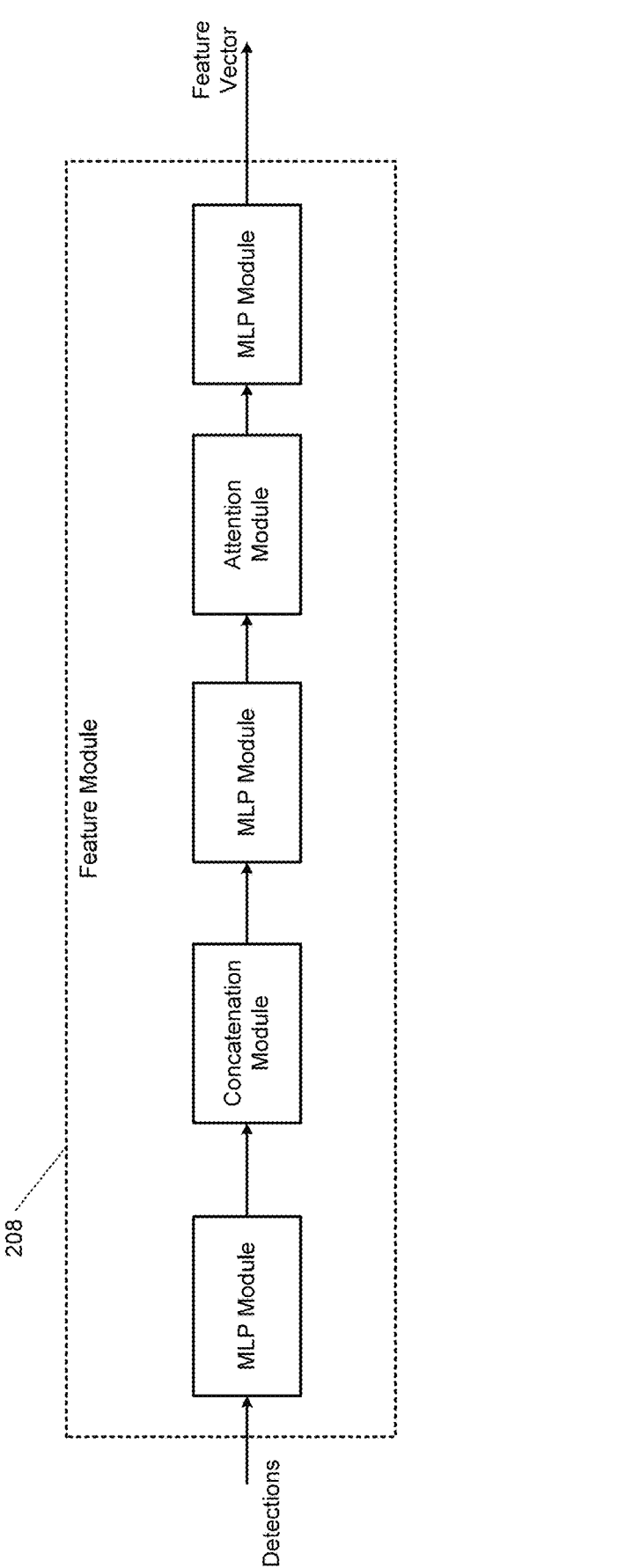

The input to the feature module 208 having the second architecture is detections of humans. The detections may include bounding box size, centroid position, and detection confidence. Only a predetermined number of the closest detections (e.g., 4 or another suitable number) may be considered at a time. Detections with the bounding boxes may be considered the closest. The detections are input to a MLP module that embeds/encodes the detections. The embeddings are concatenated by a concatenation module and input to a second MLP module that extracts a feature vector that is processed by an attention mechanism (e.g., a temporal attention based encoder) with windowing (e.g., time window of 10). A third MLP module generates the feature vector $\mathbb{R} = \hat{z}_t^{16}$ based on the output of the attention mechanism. A functional block diagram of an example implementation of the second architecture is shown in FIG. 6.

The training module 312 trains the feature module 208 using supervised learning during the second portion of the training to minimize the difference between the output of the feature module 208 for a training data sample and stored/known output of the encoder module 304 for the training data sample. More specifically, the training module may train the feature module 208 to minimize $MSE(z_t, \hat{z}_t) = \|z_t - \hat{z}_t\|^2$, where $z_t = \mu(p_t)$. While the example of minimizing mean square error (MSE) is provided, another suitable error may be used. The training module 312 may perform the second portion of the training for a predetermined number of steps (e.g., 5 million) during which the training module 312 trains the feature module 208 to minimize the MSE loss using an optimizer, such as the Adam optimizer, with a predetermined learning rate (e.g., 1e-5). Geometric and/or appearance augmentation may be applied to RGB and/or depth images to increase robustness of the learned networks and to facilitate the transfer of learned information to the robot for use at runtime.

Figure 7:
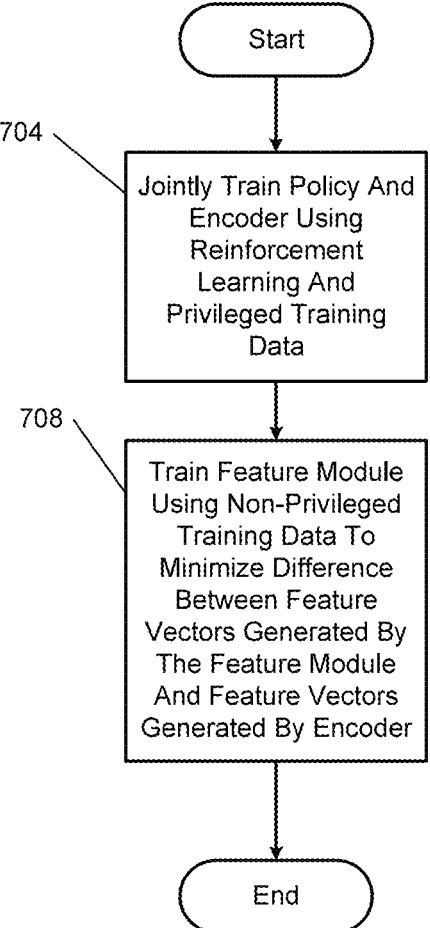
FIG. 7 is a flowchart depicting an example method of training.

FIG. 7 is a flowchart depicting an example method of training. At 704, the training module 312 performs the first portion of the training and jointly trains the encoder module 304 and the policy module 212 using reinforcement learning based on privileged information including positions of humans. The training involves the training module 312 selectively adjusting (increasing and/or decreasing) one or more parameters of the policy module 212 and the encoder module 304 to maximize reward.

At 708, the training module 312 performs the second portion of the training and trains the feature module 208 using supervised learning based on non-privileged information that does not include positions of humans. Instead, the training module 312 trains the feature module 208 including the history of depth images or the history of detections, as described above. The training involves the training module 312 selectively adjusting (increasing and/or decreasing) one or more parameters of the feature module 208 to minimize a loss, such as the MSE loss.

Figure 8:
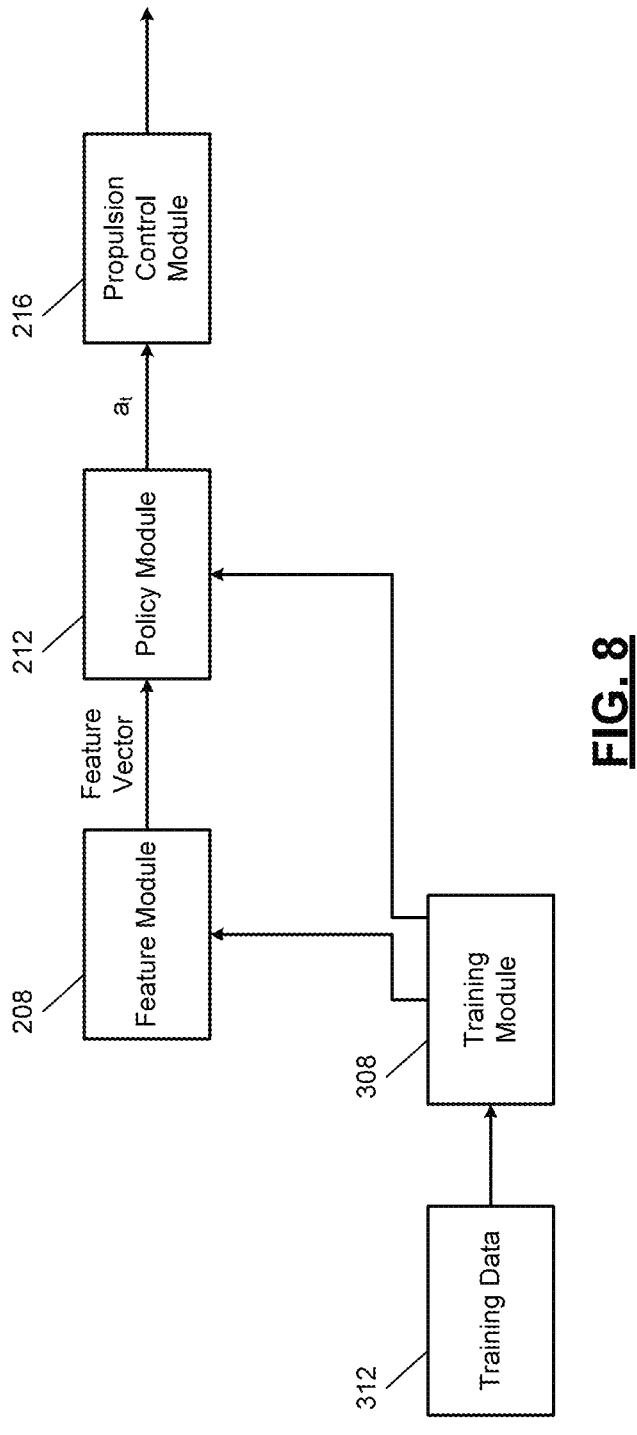
FIG. 8 is a functional block diagram of a training system.

FIG. 8 includes a functional block diagram of an example training system. In various implementations, the feature module 208 and the policy module 212 may be jointly trained using reinforcement learning based on privileged training data to maximize reward. This training may be as described above with respect to the joint training of the encoder module 304 and the policy module 212.

Reinforcement learning may be complex. However, the use of privileged training information to form a low dimensional feature vector for training the policy module 212 may positively impact the training. The control module 112 trained as described herein achieves better overall performance than other types of training and other control module architectures. The regularization effect induced by the use of privileged training information may lead to stabler training while generating higher average rewards. PPO-D trained with depth images may result in a reasonably accurately trained policy module 212 at the beginning of training when few humans are present. PPO-D performance may not converge however as the number of humans increases. Use of PPO may provide improved performance over other types of PPO algorithms and other types of optimization.

Discussed herein are systems and methods for human collision avoidance by a navigating robot in areas with crowds of humans (e.g., including at least 4 humans) using only a narrow FOV camera and without any LIDAR sensors. The policy used by the navigating robot is trained distilling privileged training information about human positions in a low dimensional vector that is reconstructed at test time using images from the camera of the navigating robot. The policy is learned without expert teacher information such as predefined trajectories computed by a motion planner yet still exhibit high levels of performance and navigational competences on a broad range of dense human crowd situations. The approach is modular and allows for different crowd trajectory modeling techniques and/or feature vector architectures without having to modify other parts of the system. Training may be significantly easier than full training using, for example, PPO.

Figure 9:
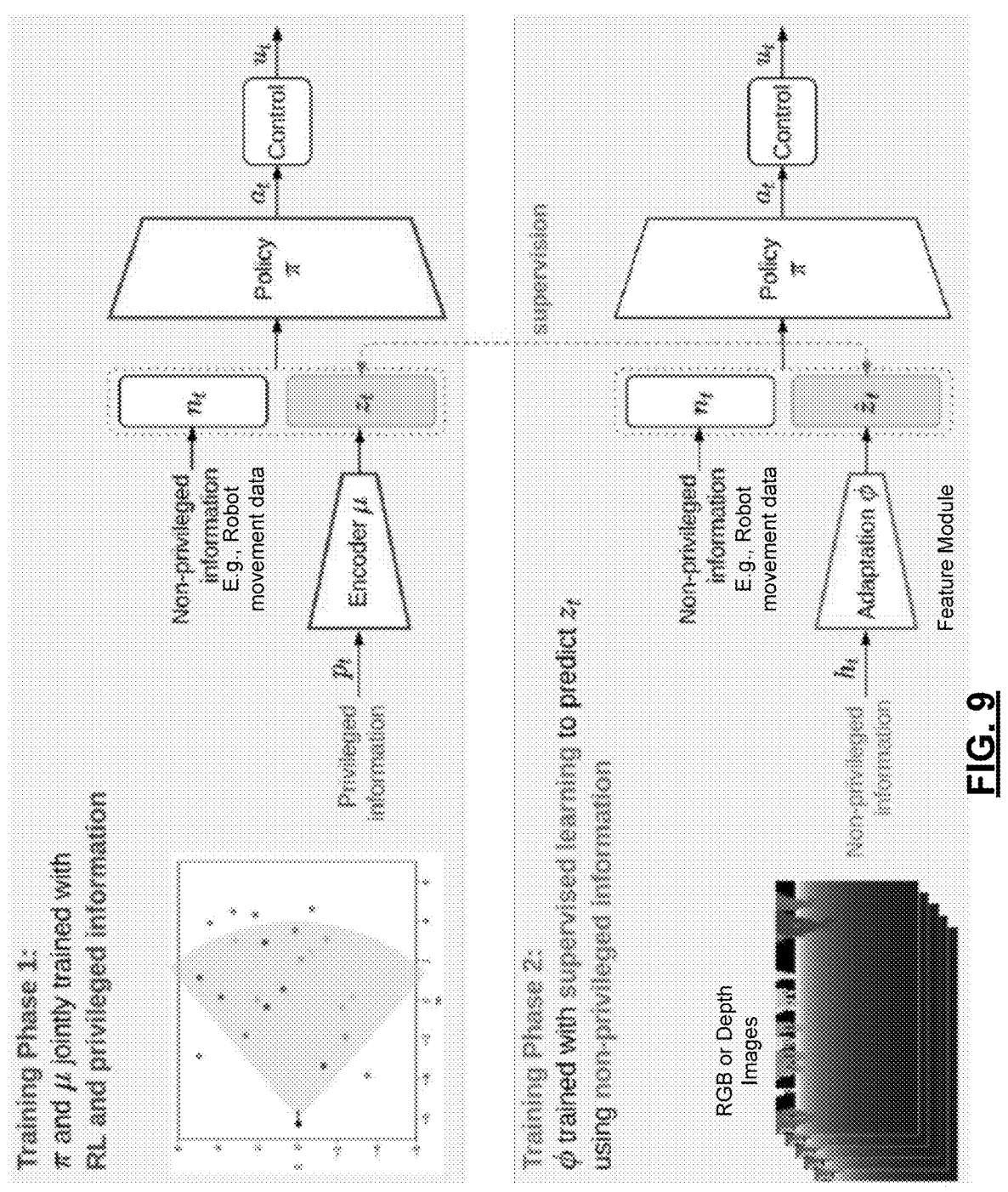
FIGS. 9 and 10 are an example illustrations of training.

FIG. 9 is an example illustration of the training. In the top portion, the black dot is the position of the robot, and the colored dots are locations of humans within the FOV of the camera of the robot. The FOV of the camera of the robot is indicated by the grey cone. The grey dots outside of the FOV of the camera are for humans where privileged information is not available. In the bottom portion, the feature module (labeled adaptation) is trained. The bottom left corner of the lower portion illustrated depth images used for the second portion of the training.

Figure 10:
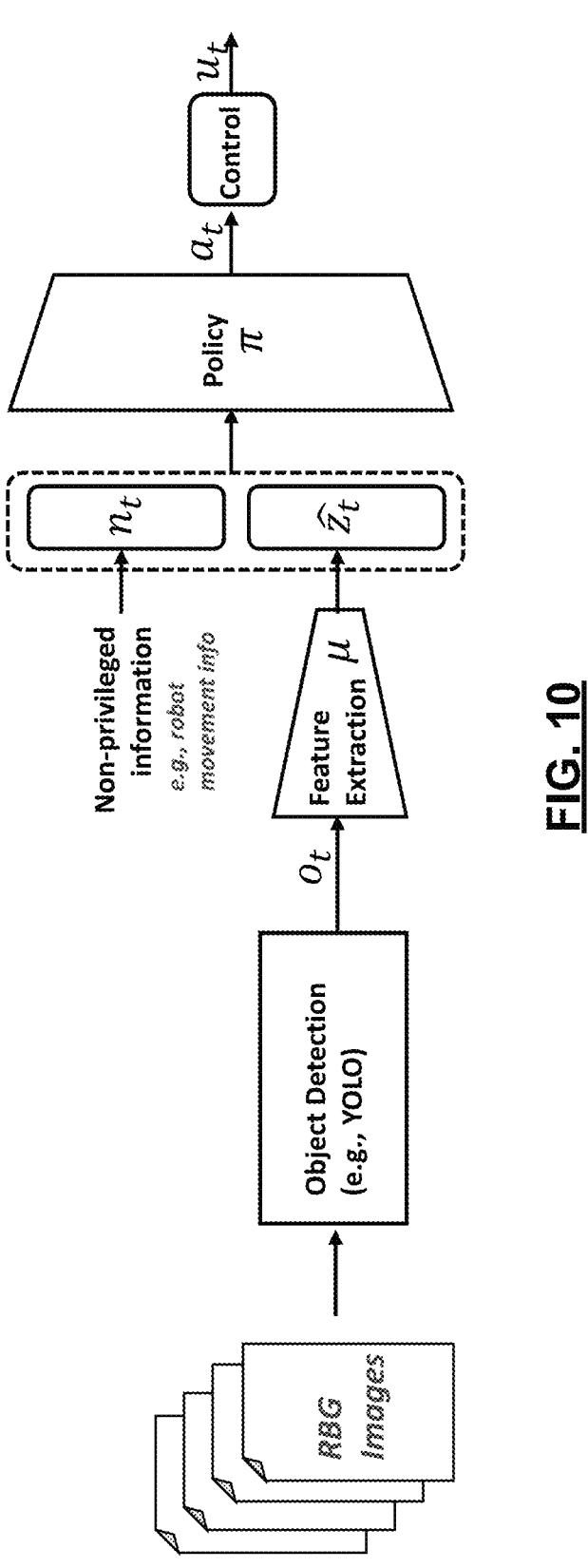

FIG. 10 is an example illustration of the training. In this example, the feature module 208 and the policy module 212 are trained jointly in a single training phase.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A navigating device, comprising:
a camera configured to capture images within a field of view of the navigating device, the field of view depicting a scene including objects;
an object detection module configured to generate detections for the objects in the scene, the detections including at least one of position, size, and bounding box confidence associated with the objects;
a feature module configured to generate feature vectors based on and the detections and to specify latent vectors that summarize movement of the objects in the scene based only on the camera images, the feature vectors summarizing the movement of the objects in the scene, and the latent vectors capturing a latent representation of trajectories in the scene of the objects;
a policy module configured to generate actions to be taken by the navigating device to navigate the scene based on the feature vectors and the latent vectors; and
a propulsion control module configured to control one or more propulsion devices of the navigating device based on the actions to be taken generated by the policy module to navigate the scene.

2. The navigating device of claim 1 wherein the navigating device is one of a robot and an autonomous vehicle.

3. The navigating device of claim 1 wherein the policy module is trained jointly with an encoder module using reinforcement learning, the encoder module being configured to generate feature vectors based on training data including positions of the objects that are humans; and wherein the feature module is trained using supervised learning to approximate the output of the encoder module based on training data without explicit positions of humans.

4. The navigating device of claim 1 wherein the policy module is trained jointly with the feature module using reinforcement learning based on training data that includes detections of the objects that are humans without explicit positions of humans.

5. A navigating robot, comprising:
a camera configured to capture images within a field of view in front of the navigating robot;
a feature module configured to generate feature vectors based on objects in the images;
a policy module configured to generate actions to be taken by the navigating robot based on the feature vectors; and
a propulsion control module configured to control one or more propulsion devices of the navigating robot based on the actions to be taken,
wherein the policy module is trained jointly with an encoder module using reinforcement learning, the encoder module being configured to generate feature vectors based on training data including positions of the objects; and
the feature module is trained using supervised learning based on training data that does not include positions of the objects and that includes one of (a) detections of the objects in images and (b) depth images including the objects.

6. The navigating robot of claim 5 wherein the policy module and the encoder module are trained jointly using a proximal policy optimization (PPO) algorithm based on maximizing a reward.

7. The navigating robot of claim 5 wherein the feature module is trained using supervised learning based on training data that does not include positions of the objects and that includes depth images.

8. The navigating robot of claim 7 wherein the feature module is trained based on minimizing a loss determined based on differences between (a) outputs of the feature module generated based on samples of the training data, respectively, and (b) stored outputs associated with the ones of the samples, respectively.

9. The navigating robot of claim 7 wherein the feature module includes:
a convolutional neural network (CNN) module;
a flattening module;
an attention module; and
a multilayer perceptron (MLP) module configured to generate the feature vectors.

10. The navigating robot of claim 9 wherein:
the CNN module is configured to extract features from the depth images; and
the MLP module configured to generate the feature vectors based on outputs of the attention module.

11. The navigating robot of claim 5 wherein the feature module is trained using supervised learning based on training data that does not include positions of the objects and that includes detections of the objects.

12. The navigating robot of claim 11 further comprising a detector module configured to generate the detections in the images.

13. The navigating robot of claim 12 wherein the detector module is configured to generate the detections using the YOLOv4 detector algorithm.

14. The navigating robot of claim 13 wherein the feature module includes:

a first multilayer perceptron (MLP) module configured to receive the detections;

a concatenation module;

a second MLP module;

an attention module; and a third MLP module configured to generate the feature vectors.

15. The navigating robot of claim 5 wherein the navigating robot does not include any light detection and ranging (LIDAR) sensors.

16. A training system, comprising:

a training dataset including:

privileged training samples including positions of humans in images; and non-privileged training samples that do not include positions of humans and that include one of (a) detections of humans in images and (b) depth images including humans; and a training module configured to:

during a first portion of training, jointly train an encoder module and a policy module for a navigating robot using reinforcement learning based on ones of the privileged training samples of the training dataset, wherein the policy module is configured to generate actions to be taken by the navigating robot based on feature vectors generated by a feature module, and wherein the feature module is configured to generate the feature vectors based on humans in images captured using a camera of the navigating robot; and during a second portion of the training after the first portion of the training, train the feature module based on ones of the non-privileged training samples.

17. The training system of claim 16 wherein the training module is configured to, during the second portion of the training, train the feature module using supervised learning.

18. The training system of claim 16 wherein the training module is configured to jointly train the policy module and the encoder module during the first portion of the training using a proximal policy optimization (PPO) algorithm based on maximizing a reward.

19. The training system of claim 16 wherein the non-privileged training samples include one of (a) detections of humans in images and (b) depth images including humans.

20. The training system of claim 16 wherein the training module is configured to train the feature module during the second portion of the training based on minimizing a loss determined based on differences between (a) outputs of the feature module generated based on ones of the non-privileged training samples, respectively, and (b) stored outputs associated with the ones of the non-privileged training samples, respectively.

21. A navigating robot, comprising:

a camera configured to capture images within a field of view in front of the navigating robot;

a feature module configured to generate feature vectors based on objects in the images;

a policy module configured to generate actions to be taken by the navigating robot based on the feature vectors; and a propulsion control module configured to control one or more propulsion devices of the navigating robot based on the actions to be taken;

wherein the policy module is trained jointly with the feature module using reinforcement learning based on training data that includes detections of the objects without explicit positions of the objects.

22. The navigating robot of claim 21 wherein the feature module is configured to:

generate detections of the objects in images using the YOLOv4 detector algorithm; and generate the feature vectors based on the detections.

23. The navigating robot of claim 21 wherein the policy module and the feature module are trained using a proximal policy optimization (PPO) algorithm based on maximizing a reward.

24. A training system, comprising:

a training dataset including:

non-privileged training samples that do not include positions of humans and that include detections of humans in images; and a training module configured to:

jointly train a feature module and a policy module for a navigating robot using reinforcement learning based on ones of the non-privileged training samples of the training dataset using reinforcement learning, wherein the policy module is configured to generate actions to be taken by the navigating robot based on feature vectors generated by the feature module, and wherein the feature module is configured to generate the feature vectors based on detections of humans in images captured using a camera of the navigating robot.

25. The training system of claim 24 wherein the training module is configured to jointly train the policy module and the feature module using a proximal policy optimization (PPO) algorithm based on maximizing a reward.

26. A navigating device, comprising:

the encoder module and the policy module trained by the training system of claim 16;

a camera configured to capture images within a field of view of the navigating device, the field of view depicting a scene including objects;

the encoder module configured to generate feature vectors based on the scene of the objects in the images captured by the camera and to specify latent vectors that summarize movement of the objects in the scene based only on the camera images, the feature vectors summarizing the movement of the objects in the scene, and the latent vectors capturing a latent representation of trajectories in the scene of the objects;

the policy module configured to generate actions to be taken by the navigating device to navigate the scene based on the feature vectors; and a propulsion control module configured to control one or more propulsion devices of the navigating device based on the actions to be taken generated by the policy module to navigate the scene.

\* \* \* \* \*